US012632930B2

(12) United States Patent
Yan et al.

(10) Patent No.: US 12,632,930 B2
(45) Date of Patent: May 19, 2026

(54) TASK-ORIENTED DEEP LEARNING IMAGE DENOISING

(71) Applicant: Rensselaer Polytechnic Institute, Troy, NY (US)

(72) Inventors: Pingkun Yan, Clifton Park, NY (US); Jiajin Zhang, Troy, NY (US); Hanqing Chao, Troy, NY (US); Ge Wang, Loudonville, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 391 days.

(21) Appl. No.: 17/954,561

(22) Filed: Sep. 28, 2022

(65) Prior Publication Data

US 2023/0099663 A1 Mar. 30, 2023

Related U.S. Application Data

(60) Provisional application No. 63/249,555, filed on Sep. 28, 2021.

(51) Int. Cl.
*G06T 5/70* (2024.01)

(52) U.S. Cl.
CPC ...... *G06T 5/70* (2024.01); *G06T 2207/10081* (2013.01); *G06T 2207/10088* (2013.01); *G06T 2207/10104* (2013.01); *G06T 2207/10108* (2013.01); *G06T 2207/20021* (2013.01); *G06T 2207/20081* (2013.01); *G06T 2207/20084* (2013.01)

(58) Field of Classification Search
CPC ....................................................... G06T 7/11
See application file for complete search history.

(56) References Cited

U.S. PATENT DOCUMENTS

| | | | |
|---|---|---|---|
| 7,822,242 B2 | 10/2010 | Kobayashi et al. | |
| 8,605,970 B2 | 12/2013 | Bar-Aviv et al. | |
| 8,824,753 B2 | 9/2014 | Souza et al. | |
| 9,332,953 B2 | 5/2016 | Suzuki | |
| 9,424,666 B2 | 8/2016 | Ye et al. | |
| 10,043,243 B2 | 8/2018 | Matviychuk et al. | |
| 10,719,961 B2 | 7/2020 | Jin et al. | |
| 10,803,984 B2 | 10/2020 | Zhou et al. | |
| 10,949,951 B2 | 3/2021 | Tang et al. | |
| 10,970,887 B2 | 4/2021 | Wang et al. | |
| 11,037,336 B2 | 6/2021 | Ye et al. | |
| 11,069,033 B2 | 7/2021 | Fang et al. | |
| 11,120,582 B2 | 9/2021 | Zhou et al. | |
| 2019/0104940 A1 | 4/2019 | Zhou et al. | |
| 2019/0213715 A1 | 7/2019 | Li et al. | |
| 2020/0043204 A1* | 2/2020 | Fu | G06T 5/70 |
| 2020/0082248 A1* | 3/2020 | Villegas | G06N 3/044 |
| 2020/0311895 A1* | 10/2020 | Sakurai | G06T 5/50 |

(Continued)

FOREIGN PATENT DOCUMENTS

WO 20220134971 A1 6/2022

*Primary Examiner* — Di Xiao

(74) *Attorney, Agent, or Firm* — Barclay Damon LLP; Anthony P. Gangemi

(57) ABSTRACT

In one embodiment, there is provided an apparatus for denoising a medical image. The apparatus includes a denoising artificial neural network (ANN) configured to denoise input image data. The denoising ANN is trained, based at least in part, on at least one loss function. The at least one loss function includes a task-oriented loss.

18 Claims, 3 Drawing Sheets

(56)        References Cited

U.S. PATENT DOCUMENTS

2020/0357098  A1      11/2020  Yoo
2020/0402644  A1      12/2020  Zhou et al.
2021/0052233  A1       2/2021  Kaplan et al.
2021/0142107  A1 *     5/2021  Vineet ...................... G06N 3/08
2021/0200965  A1 *     7/2021  Yerli ...................... G06N 3/088
2023/0029634  A1 *     2/2023  Teeple .................. G16H 30/20
2023/0368809  A1 *    11/2023  Wang .................. G10L 21/0264

* cited by examiner

100

TASK-ORIENTED DEEP LEARNING IMAGE DENOISING

CROSS REFERENCE TO RELATED APPLICATION(S)

This application claims the benefit of U.S. Provisional Application No. 63/249,555, filed Sep. 28, 2021, which is incorporated by reference as if disclosed herein in its entirety.

FIELD

The present disclosure relates to image denoising, in particular to, downstream task-oriented deep learning image denoising.

BACKGROUND

Medical imaging including, but not limited to, computed tomography (CT), magnetic resonance imaging (MRI), positron emission tomography (PET), and single-photon emission computerized tomography (SPECT), is routinely used in hospitals with millions of scans performed per year worldwide. In the case of CT scans, for example, exposure to ionizing radiation can increase a risk of genetic damage and cancer induction. Low-dose CT (LDCT) uses lower radiation dose for imaging, which helps reduce the risk but at a cost of increased noise and artifacts in reconstructed images. Such compromised CT images can negatively impact diagnosis decisions as well as downstream medical image processing tasks (e.g., image segmentation).

SUMMARY

In some embodiments, there is provided an apparatus for denoising a medical image. The apparatus includes a denoising artificial neural network (ANN) configured to denoise input image data. The denoising ANN is trained, based at least in part, on at least one loss function. The at least one loss function includes a task-oriented loss.

In some embodiments of the apparatus, the denoising ANN corresponds to a generator of a Wasserstein generative adversarial network (WGAN).

In some embodiments of the apparatus, the task-oriented loss is related to image segmentation.

In some embodiments of the apparatus, the denoising ANN is trained based, at least in part, on a plurality of loss functions. The plurality of loss functions include the task-oriented loss function and at least one of a mean square error (MSE), and a discriminator loss corresponding to a Wasserstein generative adversarial network (WGAN).

In some embodiments of the apparatus, the input image data is selected from the group including computed tomography (CT), magnetic resonance imaging (MRI), positron emission tomography (PET), and single-photon emission computerized tomography (SPECT).

In some embodiments of the apparatus, the task-oriented loss corresponds to a training task-representative network.

In some embodiments of the apparatus, an architecture of the training task-representative ANN is different from an architecture of an actual task-representative ANN.

In some embodiments, there is provided a method for denoising a medical image. The method includes training, by a training module, a denoising artificial neural network (ANN), based at least in part, on at least one loss function.

The at least one loss function includes a task-oriented loss. The method further includes denoising, by the denoising ANN, input image data.

In some embodiments of the method, the denoising ANN corresponds to a generator of a Wasserstein generative adversarial network (WGAN).

In some embodiments of the method, the task-oriented loss is related to image segmentation.

In some embodiments of the method, the input image data is selected from the group including computed tomography (CT), magnetic resonance imaging (MRI), positron emission tomography (PET), and single-photon emission computerized tomography (SPECT).

In some embodiments of the method, the training module includes a task-representative network corresponding to the task oriented loss function. The training module further includes at least one of a mean square error (MSE) loss function, and a discriminator corresponding to a Wasserstein generative adversarial network (WGAN). The denoising ANN is trained based, at least in part, on a plurality of loss functions.

In some embodiments of the method, the task-representative network is pretrained.

In some embodiments, there is provided a system for denoising a medical image. The system includes a computing device that includes a processor, a memory, an input/output circuitry, and a data store. The system further includes a denoising artificial neural network (ANN) configured to denoise input image data; and a training module configured to train the denoising ANN, based at least in part, on at least one loss function. The at least one loss function includes a task-oriented loss.

In some embodiments of the system, the denoising ANN corresponds to a generator of a Wasserstein generative adversarial network (WGAN).

In some embodiments of the system, the task-oriented loss is related to image segmentation.

In some embodiments of the system, the input image data is selected from the group including computed tomography (CT), magnetic resonance imaging (MRI), positron emission tomography (PET), and single-photon emission computerized tomography (SPECT).

In some embodiments of the system, the training module includes a task-representative network corresponding to the task oriented loss function. The training module further includes at least one of a mean square error (MSE) loss function, and a discriminator corresponding to a Wasserstein generative adversarial network (WGAN). The denoising ANN is trained based, at least in part, on a plurality of loss functions.

In some embodiments of the system, the task-representative network is pretrained.

In some embodiments, there is provided a computer readable storage device. The device has stored thereon instructions that when executed by one or more processors result in the following operations including any embodiment of the method.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Figure 1:
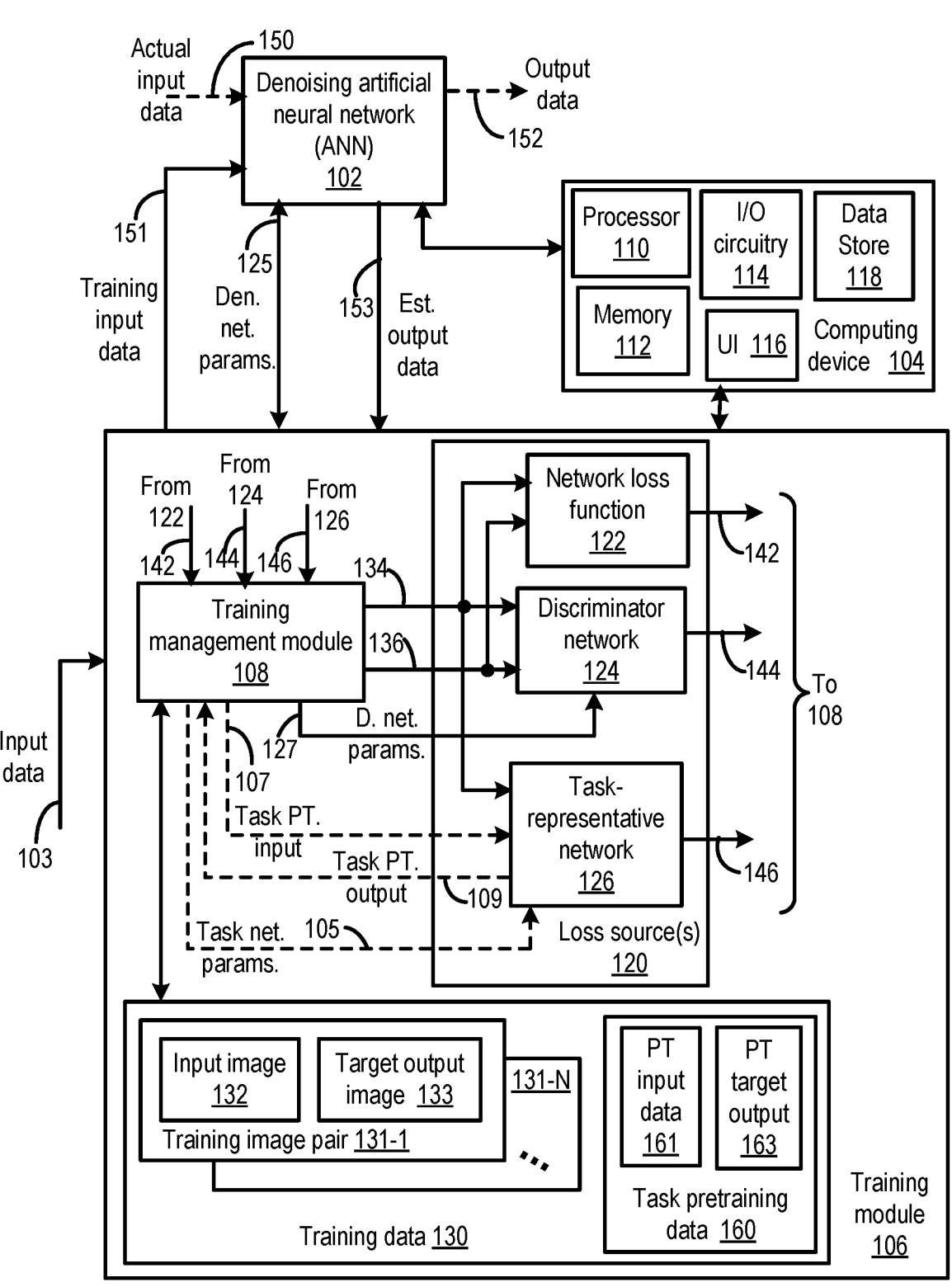
FIG. 1 illustrates a functional block diagram of a system for task-oriented image denoising, according to several embodiments of the present disclosure.

Although the following Detailed Description will proceed with reference being made to illustrative embodiments, many alternatives, modifications, and variations thereof will be apparent to those skilled in the art.

DETAILED DESCRIPTION

Considering LDCT as an example, existing LDCT denoising techniques are generally downstream task-agnostic. For example, deep learning based denoising methods are generally configured to reduce a distance between denoised LDCT images and a corresponding normal-dose CT (NDCT) counterpart, without consideration of a downstream task.

Generally, this disclosure relates to image denoising, in particular to task-oriented deep learning image denoising. A method, apparatus and/or system may be configured to denoise image data, e.g., medical image data, based, at least in part, on a task-oriented loss. The task-oriented loss may be related to a downstream application. As used herein, a downstream application corresponds to a medical imaging task and/or target imaging region. In one nonlimiting example, the medical imaging task may correspond to image segmentation. However, this disclosure is not limited in this regard. In an embodiment, the downstream task may be represented by a task-representative network, e.g., a task-representative artificial neural network (ANN). In this embodiment, the task-representative network may be pretrained, prior to implementing the task-representative network in a system for task-oriented image denoising. The pretrained task-representative network may then provide a task-specific loss during training of the system for task-oriented image denoising, as will be described in more detail below.

Thus, a method, apparatus and/or system may include a denoising ANN. The denoising ANN may be trained based, at least in part, on an awareness of the downstream application (using, for example, a task-representative network). Advantageously, awareness of the downstream task is configured to enhance the denoising performance on a corresponding task-related region. The image quality enhancement of the image data may then improve performance of a corresponding downstream task.

The method, apparatus and/or system may be termed a Task-Oriented Denoising Network (TOD-Net). In an embodiment, the TOD-Net may be trained using a task-oriented loss in a Wasserstein Generative Adversarial Network (WGAN) framework. The task-oriented loss may correspond to a fixed task-representative network of the downstream task. As used herein, a fixed task-representative network means network parameters associated with the task-representative network may not be adjusted during training the denoising ANN. The task-oriented loss may then guide optimization (i.e., adjustment) of the TOD-Net's network parameters. Advantageously, the TOD-Net may improve performance of the downstream task corresponding to the architecture of the task-representative network used during training as well as a similar downstream task corresponding to a network having a different architecture. In other words, a denoising ANN, trained according to the present disclosure, may enhance performance of a downstream task that includes a network with a different architecture than the training task-representative network.

In the following, image denoising is described using LDCT as an illustrative example. It should be noted that a system, method and/or apparatus for task-oriented image denoising, according to the present disclosure, is not limited to a particular imaging modality. The system, method and/or apparatus for task-oriented image denoising, according to the present disclosure, may be applied to any imaging modality including, but not limited to, computed tomography (CT), magnetic resonance imaging (MRI), positron emission tomography (PET), and single-photon emission computerized tomography (SPECT).

In an embodiment, a TOD-Net according to the present disclosure, may be configured to generate a denoised image from, for example, LDCT image data based, at least in part, on a plurality of losses. The plurality of losses may include, but is not limited to, a mean square error (MSE) loss, a Wasserstein Generative Adversarial Network (WGAN) discriminator loss, and a task-oriented loss. The mean square error (MSE) loss is configured to control a global Euclidean distance between a generated image (i.e., estimated image) and a corresponding NDCT image. The WGAN discriminator is configured to shrink a distance between a distribution of LDCT image data and a distribution of corresponding NDCT image data. The task-oriented loss is configured to account for downstream task-related characteristics.

As is known, a WGAN includes a generator network (G) and a discriminator network (D). In an embodiment, a denoising ANN may correspond to the generator network (G) and the discriminator network (D) may correspond to a loss source. For example, for LDCT image denoising, let x denote a LDCT image and x* be its counterpart NDCT image. As used herein, "counterpart" means "corresponding". The corresponding WGAN may then include a denoising network G and a discriminator D configured to generate an image $\hat{x}=G(x)$ with a distribution of x*. $\hat{x}$ may thus correspond to an estimate of an NDCT image.

Denoting the distribution of x as Q and the distribution of x* as P, an optimization of loss functions of the WGAN may be written as:

$$L_D(\theta_D)=\mathbb{E}_{x^*\sim P}[D(x^*;\theta_D)]-\mathbb{E}_{x\sim Q}[D(G(x;\theta_G);\theta_D)];$$
$$\text{subject to } \|\theta_D\|_1 \leq \in, \tag{1}$$

$$L_{GAN}(\theta G)=\mathbb{E}_{x\sim Q}[D(G(x;\theta_G);\theta_D)] \tag{2}$$

where $\theta_D$ and $\theta_G$ are network parameters of D and G, respectively. The discriminator network of the WGAN framework is configured to apply a relatively more smooth measurement, Wasserstein distance, to evaluate a discrepancy between P and Q. The Wasserstein distance may then facilitate stabilizing training operations of the generator and discriminator networks.

Thus, the generator network of a WGAN may correspond to a denoising ANN, as described herein, and the discriminator network of the WGAN may provide a discriminator loss.

It may be appreciated that a task-oriented loss is configured to provide the denoising ANN with an explicit awareness of the downstream task in the training phase, i.e., during training. Under task-oriented guidance, the denoising network may enhance specific features of the downstream task and thus may boost the associated performance of the entire medical image processing pipeline. In an embodiment, a representative model T of a downstream task may be incorporated into the training process. For example, an output of the denoising ANN (i.e., the denoised images) may be provided to T configured to generate a task-oriented loss. In one nonlimiting example, a TOD-Net may be configured to operate on a medical image segmentation task. Continuing with this example, a Dice loss may be minimized to determine the task-oriented loss as:

$$L_t(\theta_G) = \mathbb{E}_{x \sim Q}[1 - \text{Dice}(T(G(x; \theta_G)))]. \tag{3}$$

It may be appreciated that the task-oriented loss complements other denoising losses. It may be further appreciated that similarities and differences between respective partial derivatives of the loss functions with respect to the denoising ANN network parameters, $\theta_G$, illustrate the complementary nature of the task-oriented loss. The task-oriented loss may be compared to MSE loss $L_{MSE}$, $L_1$ loss, and perceptual loss ($L_p$). For brevity, $\hat{x}$ is used to represent $G(x)$. The loss functions' partial derivatives may then be written as:

$$\frac{\partial L_t}{\partial \theta_G} = \frac{\partial L_t}{\partial \hat{x}} \frac{\partial \hat{x}}{\partial \theta_G}, \tag{4}$$

$$L_{MSE} = \frac{1}{2}\|\hat{x} - x^*\|_2^2; \frac{\partial L_{MSE}}{\partial \theta_G} = \|\hat{x} - x^*\|_2 \frac{\partial \hat{x}}{\partial \theta_G}, \tag{5}$$

$$L_1 = \|\hat{x} - x^*\|_1; \frac{\partial L_1}{\partial \theta_G} = \mathbb{I}[\hat{x} - x^*]\frac{\partial \hat{x}}{\partial \theta_G}, \tag{6}$$

$$L_p = \frac{1}{2}\|f(\hat{x}) - f(x^*)\|_2^2; \frac{\partial L_p}{\partial \theta_G} = \|f(\hat{x}) - f(x^*)\|_2 \frac{\partial f}{\partial \hat{x}} \frac{\partial \hat{x}}{\partial \theta_G}, \tag{7}$$

where $L_t$ represents the task-oriented loss, and $f(\cdot)$ denotes the network used in the perceptual loss. In Eq. 6, $\|[\cdot]=1$ when $\cdot \geq 0$ and $\|[\cdot]=-1$ when $\cdot < 0$. Eqs. 4-7 show that the partial derivatives of all these four losses share the same term of $\partial \hat{x}/\partial \theta_G$. The differences between these loss functions are in the other part of the derivatives, denoted by $\partial L/\partial \hat{x}$. Intuitively, $\partial L/\partial \hat{x}$ calculated on an output $\hat{x}$ generated by a partially-trained denoising network, i.e., TOD-Net before converging, result in a partially denoised image $\hat{x}$ that may include relatively many artifacts. A relatively large number of artifacts may degrade the performance of a downstream segmentation network. It may be appreciated that the task-driven loss may steer the denoising network to task-related regions to improve the image quality in these regions. It may be further appreciated that, since the improvements are not for a specific representative network, the improvements may enhance other methods for this task.

In an embodiment, combining the WGAN loss, the task-oriented loss, and the mean square error, a total loss function for optimizing the denoising network G may be written as:

$$L_G = L_{GAN} + L_t + \lambda L_{MSE} \tag{8}$$

where $\lambda$ is a hyper-parameter to weight the MSE loss. The task-oriented loss and the MSE loss are configured to together enhance local features related to the downstream task, while maintaining a relatively high global quality. The loss for training the discriminator D is denoted as $L_D$ as defined in Eq. 1. In each training iteration, the two losses $L_D$ and $L_G$ may be alternately updated in the WGAN framework.

In one embodiment, there is provided an apparatus for denoising a medical image. The apparatus includes a denoising artificial neural network (ANN) configured to denoise input image data. The denoising ANN is trained, based at least in part, on at least one loss function. The at least one loss function includes a task-oriented loss.

FIG. 1 illustrates a functional block diagram of a system 100 for task-oriented image denoising, according to several embodiments of the present disclosure. System 100 includes a denoising artificial neural network (ANN) 102, a computing device 104, and a training module 106. Denoising ANN 102 and/or training module 106 may be coupled to or included in computing device 104. During training, the denoising ANN 102 is configured to receive training input data 151 from the training module 106 and to provide estimated output data 153 to the training module 106, as will be described in more detail below. In one nonlimiting example, the training data 151 may include low dose CT (LDCT) image data, and the estimated output data 153 may correspond to denoised LDCT image data that is configured to approach corresponding normal dose CT (NDCT) image data (i.e., target output image). During operation, i.e., after training operations, the denoising ANN 102 may be configured to receive actual input data 150, to denoise the actual input data, and to provide as output data 152, corresponding denoised image data, as described herein.

The denoising ANN 102 may include and/or may correspond to an artificial neural network. As used herein, "neural network" (NN) and "artificial neural network" (ANN) are used interchangeably. A neural network may include, but is not limited to, a deep ANN, a convolutional neural network (CNN), a deep CNN, a multilayer perceptron (MLP), etc.

Figure 2:
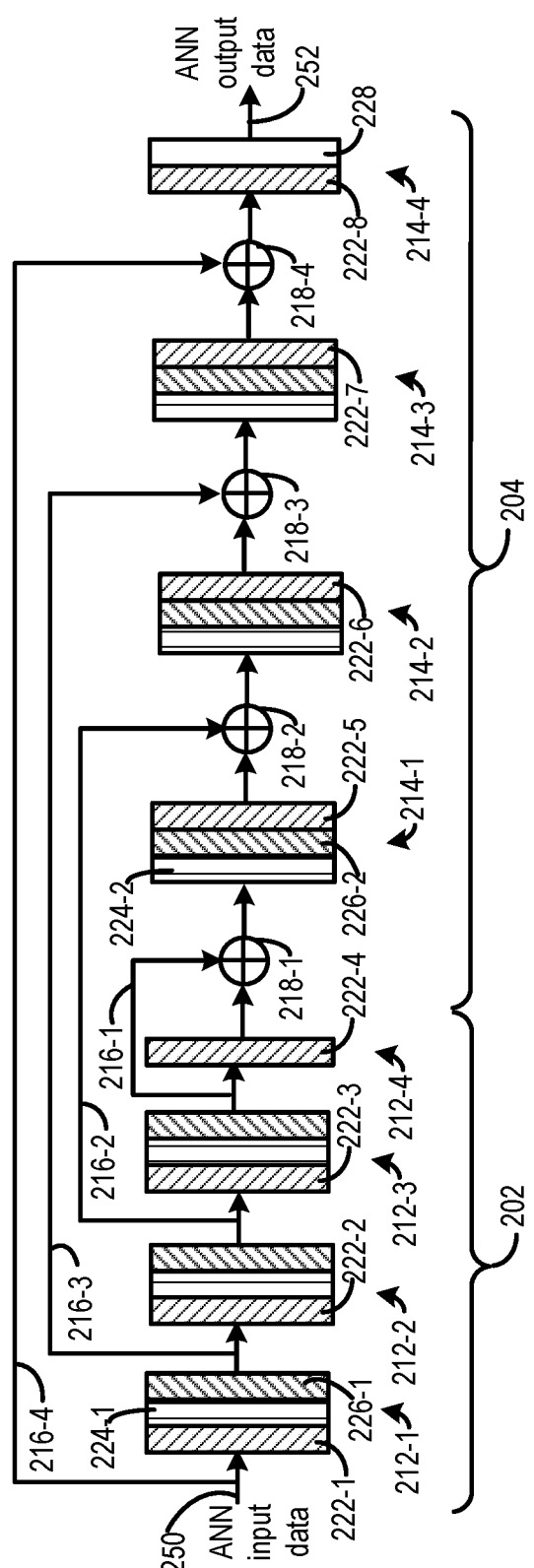
FIG. 2 illustrates a functional block diagram of one example denoising artificial neural network (ANN), according to an embodiment of the present disclosure.

FIG. 2 illustrates a functional block diagram of one example 200 denoising ANN, according to an embodiment of the present disclosure. Denoising ANN 200 is one example of the denoising ANN 102 of FIG. 1. It may be appreciated that other denoising ANN architectures may be implemented, within the scope of the present disclosure. Example denoising ANN 200 is configured to receive ANN input data 250 and to produce ANN output data 252. The ANN input data 250 may correspond to actual input data 150 or training input data 151, and the ANN output data 252 may correspond to actual output data 152 or estimated output data 153, as described herein.

Example denoising ANN 200 includes a first portion 202, and a second portion 204. The first portion 202 includes four stages 212-1, . . . , 212-4 coupled in series, and the second portion 204 includes four stages 214-1, . . . , 214-4 and four summing junctions (i.e., element-wise adders) 218-1, . . . , 218-4, alternatingly coupled in series. The ANN input data 250 is coupled to a first stage 212-1. The ANN output data 252 is output from an eighth stage 214-4. The first portion 202 is coupled to the second portion 204 by four skip connections 216-1, . . . , 216-4. Each stage includes a respective three-dimensional (3D) convolutional neural network (CNN) block, for a total of eight CNN blocks 222-1, . . . , 222-8. In one nonlimiting example, as size of each 3D kernel is 3×3×3. Each of stages 212-1, 212-2, and 212-3 includes a respective CNN block, an instance normalization block and a leaky rectified linear unit (ReLU). Thus, the first stage 212-1 includes a first 3D CNN 222-1, followed by a first instance normalization block 224-1, followed by a first leaky ReLU 226-1. A second and a third stage are configured similar to the first stage. A fourth stage 212-4 includes only a fourth 3D CNN 222-4. Each of stages 214-1, 214-2, and 214-3 includes an instance normalization block, a leaky ReLU, and a respective CNN block. Thus, a fifth stage 214-1 includes a second instance normalization block 224-2, followed by a second leaky ReLU 226-2, followed by a fifth 3D CNN 222-5. A sixth and a seventh stage are configured similar to the fifth stage. The eighth stage 214-4 includes an eighth 3D CNN 222-8 followed by a hyperbolic tangent (tanh) block 228.

In one nonlimiting example, each 3D CNN block includes a respective number of channels. Continuing with this example, the first CNN block 222-1 includes 32 channels, a second CNN block 222-2 includes 64 channels, a third CNN block 222-3 includes 128 channels, the fourth CNN block 222-4 includes 256 channels, a fifth CNN block 222-5 includes 128 channels, a sixth CNN block 222-6 includes 64 channels, a seventh CNN block 222-7 includes 32 channels, an eighth CNN block 222-8 includes one channel.

The fourth stage 212-4 and an output of the third stage 212-3 (via a first skip connection 216-1) are coupled to a first element-wise adder 218-1. An output of the first element-wise adder 218-1 is coupled to the fifth stage 214-1. An output of the fifth stage 214-1 and an output of the second stage 212-2 (via a second skip connection 216-2) are coupled to a second element-wise adder 218-2. An output of the second element-wise adder 218-2 is coupled to the sixth stage 214-2. An output of the sixth stage 214-2 and an output of the first stage 212-1 (via a third skip connection 216-3) are coupled to a third element-wise adder 218-3. An output of the third element-wise adder 218-3 is coupled to the seventh stage 214-3. An output of the seventh stage 214-3 and the ANN input data 250 (via a fourth skip connection 216-4) are coupled to a fourth element-wise adder 218-4. An output of the fourth element-wise adder 218-4 is coupled to the eighth stage 214-4.

Thus, denoising ANN 200 is one example of the denoising ANN 102 of FIG. 1. Other ANN architectures may be implemented for denoising ANN 102, within the scope of the present disclosure.

Turning again to FIG. 1, the training module 106 includes a training management module 108, and at least one loss source 120. Loss source(s) 120 include a task-representative network 126 and may include a network loss function 122, and a discriminator network 124. Training module 106 may further include training data 130. Training data 130 may include a plurality of training image data pairs 131-1, . . . , 131-N. Each training image pair, e.g., training image pair 131-1, may include an input image 132 and a corresponding target output image 133. In one nonlimiting example, the input image 132 may be LDCT image data and the target output image 133 may be corresponding NDCT image data. However, this disclosure is not limited in this regard. The training data 130 may further include task pretraining data 160 that includes pretraining (PT) input data 161 and corresponding PT target output data 163. The task pretraining data 160 may be used for pretraining the task-representative network 126, as described herein.

Computing device 104 may include, but is not limited to, a computing system (e.g., a server, a workstation computer, a desktop computer, a laptop computer, a tablet computer, an ultraportable computer, an ultramobile computer, a netbook computer and/or a subnotebook computer, etc.), and/or a smart phone. Computing device 104 includes a processor 110, a memory 112, input/output (I/O) circuitry 114, a user interface (UI) 116, and data store 118.

Processor 110 is configured to perform operations of denoising ANN 102 and/or training module 106. Memory 112 may be configured to store data associated with denoising ANN 102 and/or training module 106. I/O circuitry 114 may be configured to provide wired and/or wireless communication functionality for system 100. For example, I/O circuitry 114 may be configured to receive input data 103 and/or actual input data 150. UI 116 may include a user input device (e.g., keyboard, mouse, microphone, touch sensitive display, etc.) and/or a user output device, e.g., a display. Data store 118 may be configured to store one or more of input data 103, training data 130, actual input data 150, training input data 151, estimated output data 153, task network parameters 105, denoising network parameters 125, discriminator network parameters 127, and/or other data associated with denoising ANN 102 and/or training module 106.

Training module 106 is configured to receive input data 103. Input data 103 may include, for example, a plurality of image data records. Each image data record may include a training image pair. Input data 103 may further include task pretraining data. Training module 106, e.g., training management module 108, may be configured to store the input data 103 in training input data 130 as training image pairs 131-1, . . . , 131-N, or task pretraining data 160.

In some embodiments, the task-representative network 126 may be trained, i.e., pretrained, prior to training denoising ANN 102. As used herein, "pretraining" corresponds to training task-representative network 126 prior to training denoising ANN 102. In one nonlimiting example, task-representative network 126 may be pretrained to implement image segmentation. However, this disclosure is not limited in this regard. Thus, training management module 108 may be configured to pretrain task-representative network 126. In one nonlimiting example, task-representative network 126 may correspond to an ANN. However, this disclosure is not limited in this regard.

Task-representative network 126 may be pretrained based, at least in part, on task pretraining data 160, included in training data 130. During pretraining, training management module 108 may be configured to select a task PT input 107 from PT input data 161 and to provide the task PT input 107 to the task-representative network 126. Training management module 108 may then be configured to capture a corresponding task PT output 109 from the task-representative network 126, to evaluate a cost function, and to adjust one or more task network parameter(s) 105 based, at least in part, on the evaluation. Evaluating the cost function may be based, at least in part, on a corresponding PT target output 163, associated with the task PT input 107, and based, at least in part, on task PT output 109. At a completion of the pretraining, the task network parameter(s) 105 may be fixed. Denoising ANN 102 may then be trained, as described herein, with the task-representative network parameters (e.g., task network parameters 105) fixed.

Training management module 108 may be configured to train denoising ANN 102. During training, training management module 108 may be configured to select a training image pair, e.g., training image pair 131-1, and to provide the input image 132 to denoising ANN 102 as training input data 151. Training management module 108 may then be configured to capture a corresponding estimated output data 153 from denoising ANN 102. Training management module 108 may be further configured to provide the estimated output data 153 and the corresponding target output image, e.g., target output image 133, to the loss source(s) 120 as selected estimated output data 134 and selected target output data 136, respectively. The selected estimated output data 134 may be provided to the network loss function 122, the discriminator network 124 and the task-representative network 126. The selected target output data 136 may be provided to the network loss function 122, and the discriminator network 124.

In one nonlimiting example, the network loss function 122 may correspond to a mean square error, the denoising ANN 102 and discriminator network 124 may correspond to a WGAN, as described herein. However, this disclosure is not limited in this regard. In one nonlimiting example, the task-representative network 126 may correspond to an image segmentation network, as described herein. However, this disclosure is not limited in this regard.

Training management module 108 is configured to manage training of denoising ANN 102. Training management module 108 may thus be configured to provide a plurality of selected estimated output data 134 and selected target output data 136 sets to the loss source(s) 120. Each estimated data set and corresponding target data set pair may correspond to a respective input image. Training management module 108 may be configured to optimize the loss source(s) 120 by adjusting and/or optimizing denoising network parameters 125, and discriminator network parameters 127. In one nonlimiting example, the denoising network parameters 125, and discriminator network parameters 127 may be adjusted alternatingly, i.e., in the WGAN framework. Thus, training operations may be configured to optimize network parameters 125, 127. The network parameter 125, 127 optimizations may be related to one or more loss source(s) 120, as described herein.

After training, denoising ANN 102 may be configured to receive actual input data 150 and to produce corresponding output data 152. In one nonlimiting example, the actual input data 150 may correspond to LDCT image data and the output data 152 may correspond to denoised CT image data that is configured to approach NDCT image data.

It may be appreciated that while the apparatus, method and/or system for task-oriented deep learning image denoising have been described with respect to LDCT image data, the apparatus, method and/or system may be utilized for medical imaging tasks, within the scope of the present disclosure. The medical imaging tasks may include, but are not limited to, computed tomography (CT), magnetic resonance imaging (MRI), positron emission tomography (PET), and single-photon emission computerized tomography (SPECT).

Figures 3, 4:
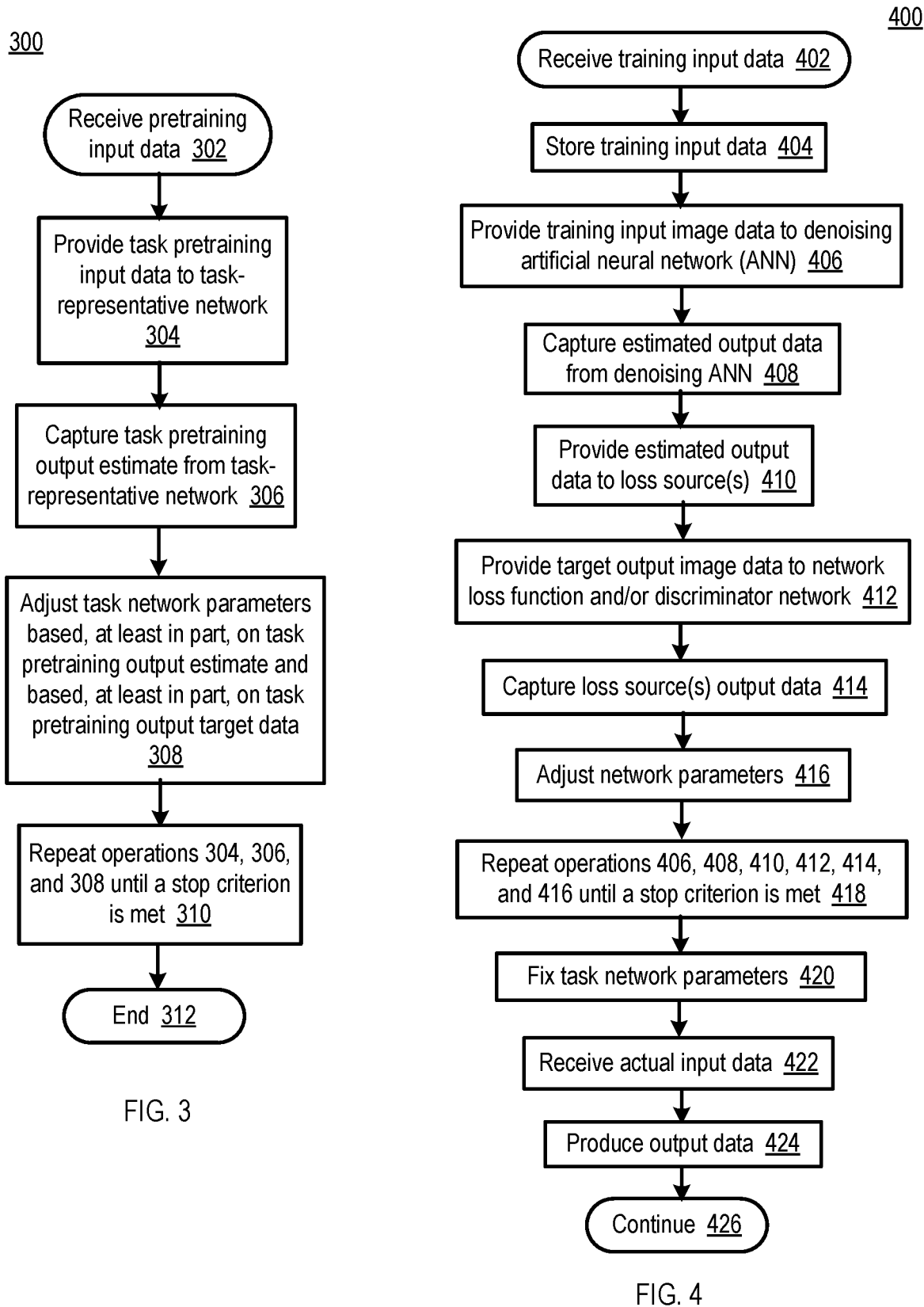
FIG. 3 is a flowchart of operations for pretraining a task-representative network, according to various embodiments of the present disclosure.
FIG. 4 is a flowchart of operations for training and using a denoising artificial neural network for task-oriented image denoising, according to various embodiments of the present disclosure.

FIG. 3 is a flowchart 300 of operations for pretraining a task-representative network, according to various embodiments of the present disclosure. In particular, the flowchart 300 illustrates pretraining a task-representative network, to determine and fix task network parameters, related to a downstream task. The operations may be performed, for example, by the system 100 (e.g., training module 106, training management module 108 and/or task-representative network 126) of FIG. 1.

Operations of this embodiment may begin with receiving pretraining input data at operation 302. Operation 304 may include providing task pretraining input data to a task-representative network. Operation 306 may include capturing task pretraining output estimate from task-representative network. Operation 308 may include adjusting task network parameters based, at least in part, on task pretraining output estimate and based, at least in part, on task pretraining output target data. Operations 304, 306, and 308 may be repeated until a stop criterion is met at operation 310. Program flow may then end at operation 312

Thus, a task-representative network may be pretrained, and task network parameters fixed, prior to inclusion in a training module, as described herein.

FIG. 4 is a flowchart 400 of operations for training and using a denoising ANN for task-oriented image denoising, according to various embodiments of the present disclosure. In particular, the flowchart 400 illustrates training a denoising ANN based, at least in part, on a loss function that includes a task-oriented loss. The operations may be performed, for example, by the system 100 (e.g., denoising ANN 102, and/or training module 106) of FIG. 1.

Operations of this embodiment may begin with receiving training input data at operation 402. Operation 404 may include storing training input data. Operation 406 may include providing training input image data to a denoising artificial neural network (ANN). Operation 408 may include capturing estimated output data from the denoising ANN. Operation 410 may include providing estimated output data to loss source(s). Target output image data may be provided to a network loss function and/or discriminator network at operation 412. Loss source(s) output data may be captured at operation 414. Operation 416 may include adjusting network parameters. Operation 418 may include repeating operations 406, 408, 410, 412, 414, and 416, until a stop criterion is met. Task network parameters may be fixed at operation 420. Actual input data may be received at operation 422. Output data may be produced at operation 424. Program flow may then continue at operation 426.

Thus, a denoising ANN may be trained based, at least in part, on a task-oriented loss. The task-oriented loss may correspond to a task-representative network that has been pretrained, as described herein.

Experimental Data

Four segmentation networks were used as example task-representative networks, including U-Net, V-Net, Res-U-Net and Vox-ResNet. Each segmentation network was pre-trained independently on the LiTS (Liver tumor segmentation challenge (2019)) and KiTS (Kidney tumor segmentation challenge (2019)) training sets. On the LiTS test set, the four segmentation networks achieved Dice of 94.31%, 92.80%, 93.51%, and 92.08%, respectively. On the KiTS test set, these four segmentation networks achieved Dice of 90.87%, 89.61%, 89.78%, and 89.35%, respectively.

For all the datasets, the pixel intensity is clamped with a window of [−200,200] HU (Hounsfield Units) and normalized to [0,1]. Prior to training a denoising network, the images were resized to have an in-plane resolution of 1.5 mm (millimeter)×1.5 mm and a slice spacing of 1 mm. The axial slices were then center cropped/zero padded to a size of 256×256 pixels. To generate training batches, the 3D LDCT images and segmentation ground truth were split into a plurality of overlapping 256×256×32 sub-volumes. In the validation and test phase, the TOD-Net was applied directly on an original volume with size of 512×512× #slices.

When training the TOD-Net, according to the present disclosure, the trained U-Net was used as the representative downstream model in the task-oriented loss. Then, the trained TOD-Net was directly applied to all the four segmentation networks to verify the generalizability. The WGAN discriminator used in the training was a 3 layer 3D CNN followed by a fully connected layer with a single output. Each 3D convolutional layer was followed by a batch normalization layer and a leaky ReLU layer. The kernel size of all convolutional layers was 3×3×3. The channel sizes of the layers were 32, 64, and 128, respectively. Due to a limitation of GPU memory, in the training phase of TOD-Net, each 3D LDCT image was cropped into 256×256×32 patches with a sliding window. On LD-LiTS and LD-KiTS, the TOD-Net was separately trained by the RMSprop optimizer with a learning rate of 0.0005 and a batch size of 4 for 50 epochs. The hyperparameter $\lambda$ in $L_G$ was set to be 0.5 and the gradient clipping value e in Eq. 1 was set to be 0.01. One checkpoint was saved at the end of each epoch and the checkpoint with the best performance on the validation set was used as the final model.

In this experiment, the TOD-Net, as described herein, was cascaded with each of the four segmentation networks to evaluate its influence on the downstream task, corresponding to the task-representative network. The results on LD-LiTS and LD-KiTS are shown in Tables 1A and 1B. Since LDCT images typically contain relatively more noise and artifacts compared to NDCT images, directly applying segmentation models trained on NDCT to LDCT images is expected to result in a significant performance degradation, as shown by the rows of "No denoiser" in Tables 1A and 1B. In contrast, using the denoised images improved the segmentation performance.

TABLE 1A

Comparison of no denoiser and TOD-Net on downstream task
Dice score (%) and generalizability on LD-LiTS data set.

| Denoiser | U-Net | Generalize to other task-representative networks | | |
| | | Vox-ResNet | V-Net | Res-U-Net |
| --- | --- | --- | --- | --- |
| No denoiser | 88.75 | 79.82 | 89.75 | 90.36 |
| TOD-Net | 93.91 | 91.86 | 92.44 | 92.77 |

TABLE 1B

Comparison of no denoiser and TOD-Net on downstream task
Dice score (%) and generalizability on LD-KiTS data set.

| Denoiser | U-Net | Generalize to other task-representative networks | | |
| | | Vox-ResNet | V-Net | Res-U-Net |
| --- | --- | --- | --- | --- |
| No denoiser | 75.30 | 43.09 | 80.75 | 80.57 |
| TOD-Net | 90.21 | 89.81 | 89.83 | 90.03 |

TABLE 2A

TOD-Net performance on actual CT images on downstream task
Dice score (%) and generalizability on LiTS data set.

| Denoiser | U-Net | Generalize to other task-representative networks | | |
| | | Vox-ResNet | V-Net | Res-U-Net |
| --- | --- | --- | --- | --- |
| No denoiser | 94.33 | 92.19 | 92.82 | 93.51 |
| TOD-Net | 95.01 | 92.43 | 93.44 | 93.21 |

TABLE 2B

TOD-Net performance on actual CT images on downstream task
Dice score (%) and generalizability on KiTS data set.

| Denoiser | U-Net | Generalize to other task-representative networks | | |
| | | Vox-ResNet | V-Net | Res-U-Net |
| --- | --- | --- | --- | --- |
| No denoiser | 90.93 | 89.39 | 89.58 | 89.81 |
| TOD-Net | 91.52 | 90.41 | 91.37 | 91.03 |

Generally, this disclosure relates to image denoising, in particular to task-oriented deep learning image denoising. A method, apparatus and/or system may be configured to denoise image data, e.g., medical image data, based, at least in part, on a task-oriented loss. The task-oriented loss may be related to a downstream application. In an embodiment, the downstream task may be represented by a task-representative network. In this embodiment, the task-representative network may be pretrained, prior to implementing the task-representative network in a system for task-oriented image denoising. The pretrained task-representative network may then provide a task-specific loss during training of the system for task-oriented image denoising.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hard-wired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus for denoising a medical image, the apparatus comprising:
   a computer readable storage device;
   a denoising artificial neural network (ANN) configured to denoise input image data;
   a training module, configured to train the denoising ANN according to instructions stored on the computer-readable storage device, based at least in part, on at least one loss function, the at least one loss function comprising a task-oriented loss function,
   wherein the task-oriented loss function is related to a downstream task,
   wherein the training module comprises a task-representative network corresponding to the task-oriented loss function,
   wherein the task-representative network is configured to be pretrained according to instructions stored on the computer readable storage device with task pretraining data, the task pretraining data including pretraining input data and corresponding pretraining target output data, and
   wherein pre-training the task-representative network includes determining and fixing task-representative network parameters related to the downstream task so that the task network parameters are not adjusted during training the denoising ANN.

2. The apparatus of claim 1, wherein the denoising ANN corresponds to a generator of a Wasserstein generative adversarial network (WGAN).

3. The apparatus of claim 1, wherein the task-oriented loss is related to image segmentation.

4. The apparatus of claim 1, wherein the denoising ANN is trained based, at least in part, on a plurality of loss functions, the plurality of loss functions comprising the task-oriented loss function and at least one of a mean square error (MSE), and a discriminator loss corresponding to a Wasserstein generative adversarial network (WGAN).

5. The apparatus of claim 1, wherein the input image data is selected from the group comprising computed tomography (CT), magnetic resonance imaging (MRI), positron emission tomography (PET), and single-photon emission computerized tomography (SPECT).

6. The apparatus of claim 1, wherein the task-oriented loss corresponds to a training task-representative network.

7. The apparatus of claim 6, wherein an architecture of the training task-representative ANN is different from an architecture of an actual task-representative ANN.

8. A method for denoising a medical image, the method comprising:
   pretraining a training module comprising a task-representative network corresponding to a task-oriented loss function with task pretraining data, the task pretraining data including pretraining input data and corresponding pretraining target output data, wherein pre-training the task-representative network includes determining and fixing task-representative network parameters related to the downstream task so that the task network parameters are not adjusted during training the denoising ANN;
   training, by the training module, a denoising artificial neural network (ANN), based at least in part, on at least one loss function, the at least one loss function comprising a task-oriented loss function; and
   denoising, by the denoising ANN, input image data, wherein the task-oriented loss function is related to a downstream application.

9. The method of claim 8, wherein the denoising ANN corresponds to a generator of a Wasserstein generative adversarial network (WGAN).

10. The method of claim 8, wherein the task-oriented loss is related to image segmentation.

11. The method of claim 8, wherein the input image data is selected from the group comprising computed tomography (CT), magnetic resonance imaging (MRI), positron emission tomography (PET), and single-photon emission computerized tomography (SPECT).

12. The method of claim 8, wherein the training module further comprises at least one of a mean square error (MSE) loss function, and a discriminator corresponding to a Wasserstein generative adversarial network (WGAN), and the denoising ANN is trained based, at least in part, on a plurality of loss functions.

13. A computer readable storage device having stored thereon instructions that when executed by one or more processors result in the operations comprising the method according to claim 8.

14. A system for denoising a medical image, the system comprising:
   a computing device comprising a processor, a memory, an input/output circuitry, and a data store;
   a denoising artificial neural network (ANN) configured to denoise input image data;
   a training module, configured to train the denoising ANN based at least in part on at least one loss function, the at least one loss function comprising a task-oriented loss function,
   wherein the task-oriented loss function is related to a downstream application, and
   wherein the training module comprises a task-representative network corresponding to the task-oriented loss function, the training module configured to be pre-trained with task pretraining data, the task pretraining data including pretraining input data and corresponding pretraining target output data, and
   wherein pre-training the task-representative network includes determining and fixing task-representative network parameters related to the downstream task so that the task network parameters are not adjusted during training the denoising ANN.

15. The system of claim 14, wherein the denoising ANN corresponds to a generator of a Wasserstein generative adversarial network (WGAN).

16. The system of claim 14, wherein the task-oriented loss is related to image segmentation.

17. The system of claim 14, wherein the input image data is selected from the group comprising computed tomography (CT), magnetic resonance imaging (MRI), positron emission tomography (PET), and single-photon emission computerized tomography (SPECT).

18. The system of claim 14, wherein the training module further comprises at least one of a mean square error (MSE) loss function, and a discriminator corresponding to a Wasserstein generative adversarial network (WGAN), and the denoising ANN is trained based, at least in part, on a plurality of loss functions.

* * * * *